Patented Feb. 12, 1929.

1,702,180

UNITED STATES PATENT OFFICE.

ROBERT H. VAN SCHAACK, JR., OF EVANSTON, ILLINOIS, ASSIGNOR TO VAN SCHAACK BROS. CHEMICAL WORKS, INC., OF CHICAGO, ILLINOIS, A CORPORATION OF ILLINOIS.

HEXYL ESTERS.

No Drawing.    Application filed January 20, 1928.    Serial No. 248,272.

My invention relates to a composition of matter comprising the methyl-isobutyl-methyl ester of propionic acid or another aliphatic acid of larger molecular weight.

An ester of this type may be produced by the interaction of the sodium salt of the fatty acid and methyl-isobutyl-methyl chloride. It is more convenient, however, to prepare first the alcohol, methyl-isobutyl carbinal, and then esterify it with the fatty acid whose radical is desired in the finished ester, the esterification being made under such conditions as not to lead to substantial decomposition into a substance or substances of lower boiling point than methyl-isobutyl carbinol.

Some of the esters of this type may be represented by the following type formulas:

1.  

Here R represents a monovalent group of carbon and hydrogen atoms as, for example, methyl, ethyl, propyl, butyl, $C_{15}H_{31}$, $C_{17}H_{35}$, phenyl, or alpha- or beta-hydroxy-propyl, and $x$ represents an integral number such as in the range 1 to 16.

2.  

Here $R^1$ represents a divalent group of carbon and hydrogen atoms, as, for example, methylene: $CH_2$, ethylene: $C_2H_4$, phenylene: $C_6H_4$, or the radical of tartaric acid: $C_2H_2(OH)_2$.

A specific example of my invention is the propionate of methyl-isobutyl carbinol,

CH₃.CH₂.COO.CH(CH₃).CH₂.CH(CH₃)₂, which I name also as methyl-isobutyl-methyl propionate. Other examples of the invention are methyl-isobutyl-methyl butyrate,

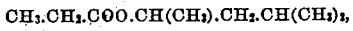

methyl-isobutyl-methyl valerate,

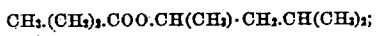

methyl-isobutyl-methyl palmitate,

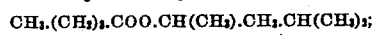

and methyl-isobutyl-methyl stearate,

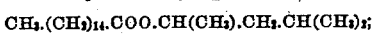

Other examples are the oxalate, citrate, tartrate, oleate, laurate, and succinate of methyl-isobutyl carbinol.

Each of the esters may be prepared as follows: 1 equivalent weight of the aliphatic acid (whose radical it is desired to have in the finished ester) is boiled for two to eight hours with 1 equivalent weight of methyl-isobutyl carbinol and 30% of benzol and 0.02% of sulfuric acid, on the weight of the aliphatic acid, under a fractionating column. The fractionated vapors from the top of the column are passed downward through a condenser. The condensed liquid is separated into two layers; the lower contains water, the upper benzol with some of the ester and some methyl-isobutyl carbinol. The lower layer is discarded or reserved for recovery from it of the materials of value—chiefly small amounts or traces of methyl-isobutyl carbinol, the fatty acid, the ester of the fatty acid with methyl isobutyl carbinol, and benzol. The upper layer is returned to the reaction vessel or still, either at intervals or continuously. I have returned it continuously. When the lower layer of the condensate practically ceases to appear in the distillate, it is assumed that water is not being formed rapidly in the reaction flask and, therefore, that the esterification is substantially complete. The material in the still, which comprises a benzol solution of the desired ester with smaller amounts of other substances, is then cooled and agitated with an aqueous solution of sodium carbonate until the remaining acidity of the upper or ester layer is less than 0.2%. I have neutralized, in fact, to a residual acidity of less than 0.1% of acid, calculated as stearic acid.

The neutralized ester, still in solution in benzol, is then washed with an equal volume of cold water, separated from the washing by difference in specific gravity, and fractionated. The first portions of distillate contain benzol and any water as well as uncombined methyl-isobutyl carbinol that may have been present in the neutralized, washed ester. As the fractionation proceeds, the boiling point or temperature of the fractionated vapors rises to a temperature higher than that of the methyl-isobutyl carbinol (that is, above 132° C.) and, finally, becomes constant at the boiling point of the methyl-isobutyl-methyl ester of the fatty acid used. To avoid decomposition, the ester may be distilled in vacuo, as, for example, at a pressure equal to 10 mm. of mercury. I find it a safe practice to distil in vacuo any methyl-isobutyl-methyl ester of a fatty acid containing more than one carboxyl group or more than four carbon atoms.

The method of preparation is further illustrated by the following preparation in which the fatty acid used was propionic acid. One hundred and two parts by weight of methyl-isobutyl carbinol were mixed with 74 of propionic acid (containing also 3 of water), 80 of benzol, and 2 of sulfuric acid. The mixture was boiled under a small fractionating column for two hours and forty minutes. During that time the temperature below the surface of the boiling liquid rose from 84° C., at a moment shortly after the start of the boiling, to 110° C. and there was condensed from the fractionated vapors a total of approximately 20 parts of an aqueous layer. This aqueous layer was drained from the bottom of a receiving tank and discarded. The "oil" layer which condensed along with the water and formed a layer on top of it was drained substantially continuously from the top of the receiver back to the still.

At the conclusion of the 2 hours and 40 minutes heating, analysis showed more than 90 per cent of the propionic acid to have been esterified with the methyl-isobutyl carbinol. The remaining propionic acid in the material in the still as well as the sulfuric acid which had been used as the catalyst were then neutralized by thorough agitation with an excess of sodium carbonate dissolved in 10 times its weight of water. The neutralized solution, comprising a solution of methyl-isobutyl-methyl propionate in benzol, was washed with an equal volume of water and the water separated. The washed "oil" was then fractionated. The material distilling at 163° C. at atmospheric pressure was accepted as methyl-isobutyl-methyl propionate.

Methyl-isobutyl-methyl propionate is a colorless liquid of a pleasing odor suggestive of a terpene. The amount delivered by a 5-cc. pipet at 25° C. weighed 4.344 g., which indicates an approximate specific gravity of 0.87. Methyl-isobutyl-methyl propionate is a solvent for pyroxylin and is compatible with ester, dammar, and shellac resins. Methyl-isobutyl-methyl propionate is, therefore, useful as an ingredient of pyroxylin lacquer, particularly to prevent excessively quick drying of a brushed lacquer film or to prevent permanent blushing in a sprayed lacquer film.

In order to have a maximum effect as a brush mark or blush eliminator, the methyl-isobutyl-methyl ester should be the ester of an aliphatic acid of lower evaporation rate at room temperatures, that is, of higher boiling point, than that of formic or acetic acid. I have used the methyl-isobutyl-methyl esters of aliphatic acids of boiling point above 130° C.

The methyl-isobutyl-methyl esters of monocarboxylic aliphatic acids containing more than 3 carbon atoms to the molecule of acids have higher boiling points than the corresponding propionate and lower solvent power for pyroxylin. All of the esters of methyl-isobutyl carbinol are hydrolyzed by boiling with aqueous caustic soda solution into methyl-isobutyl carbinol and the sodium salt of the acid whose radical was present in the ester. By identifying the methyl-isobutyl carbinol, by odor, boiling point, and conversion with acetic anhydride to its acetate ester, and by identifying the salt of the acid produced by the hydrolysis, as by conversion with alcohol and sulfuric acid to the ethyl ester and noting the boiling point, one identifies the original ester which was hydrolyzed.

Many variations may be made from the specific examples of my invention without departing from the spirit of it. In the method of preparation, for example, many variations may be made by one skilled in the art. I have intended only to describe at least one convenient method of preparing this type of ester.

I claim:

1. A composition of matter comprising the methyl-isobutyl-methyl ester of an aliphatic acid of boiling point above 130° C.

2. A composition of matter comprising the methyl-isobutyl-methyl ester of a monocarboxylic aliphatic acid of boiling point above 130° C.

3. A composition of matter comprising the methyl-isobutyl-methyl ester of propionic acid.

4. A composition of matter comprising a methyl-isobutyl-methyl ester of the formula

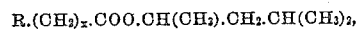

in which R represents a monovalent group of carbon and hydrogen atoms and x represents an integral number which is not less than 1.

ROBERT H. VAN SCHAACK, Jr.